Oct. 16, 1934.  G. A. BIGGS  1,977,036
HYDRAULIC TURBINE
Filed Dec. 15, 1932
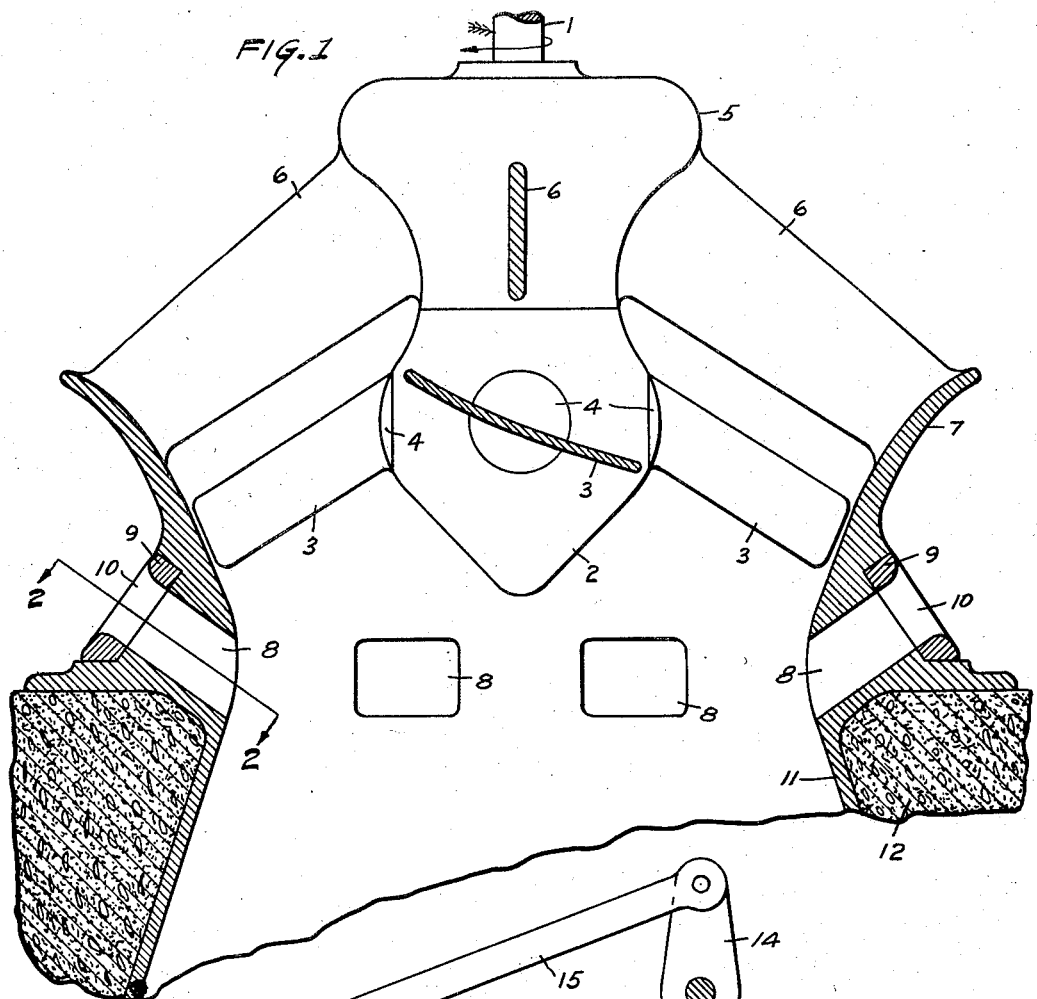
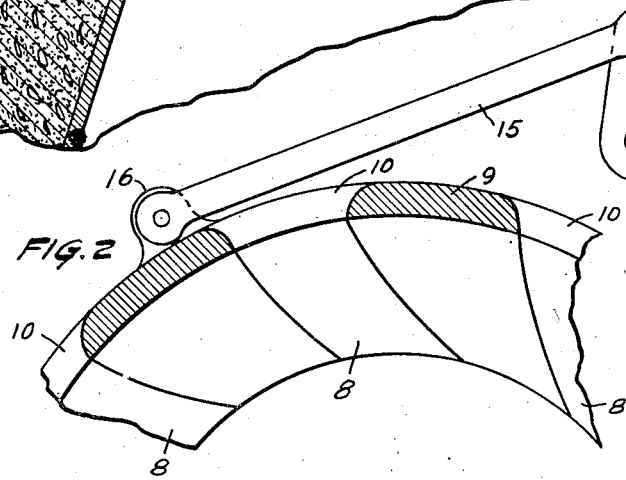
INVENTOR
GEORGE A. BIGGS.
BY
ATTORNEYS Patented Oct. 16, 1934

1,977,036

UNITED STATES PATENT OFFICE 1,977,036

HYDRAULIC TURBINE

George A. Biggs, Springfield, Ohio, assignor to The James Leffel & Company, Springfield, Ohio, a corporation of Ohio Application December 15, 1932, Serial No. 647,357

8 Claims. (Cl. 253—117)

This invention relates to improvements in turbines, and has for its object to provide in connection with the runner and runner shaft of a turbine, means for increasing the flow of the water after it has passed the runner.

It is particularly the object of this invention to provide, in connection with the runner of a turbine, means for diverting part of the main body of the water used for operating the turbine and conducting it to a plurality of points beyond the turbine so that the diverted water will act upon the water having passed the runner to increase the flow thereof; the increase in the flow being produced by causing the diverted water to flow in streams substantially tangential to the water used in operating the turbine so that the whirl of the water caused by the operation of the turbine will be increased, thereby causing an increase in the speed of flow of the water from the turbine.

It is a further object of this invention to provide, in connection with an axial flow of water through the turbine, means to cause a whirling component of the water below the turbine.

These and other objects and advantages will appear from the following description taken in connection with the drawing.

Referring to the drawing:

Figure 1 is a vertical section through part of the draft tube of a turbine, showing the runner and runner shaft supported in the draft tube.

Figure 2 is a section on the line 2—2 of Figure 1.

The vertically disposed runner shaft 1 has on its lower end a runner 2, which has extending therefrom buckets 3. These buckets extend radially and downwardly from the runner and are supported in the runner by means of hubs 4 fitting within suitable bearings in the runner. The runner and runner shaft are supported by means of a support 5, which provides a bearing for the shaft and supports the shaft for rotation with the runner immediately beneath the support.

Extending downwardly and outwardly from the support 5 is a plurality of guide vanes 6, which are substantially parallel to the buckets 3. The outer ends of the guide vanes are formed integral with a gate ring 7 suitably supported on a concrete base 12. Extending downwardly and inwardly with respect to the gate ring and a draft tube 11, is a plurality of obliquely or tangentially arranged openings 8, which extend from the outer periphery, through the wall of the gate ring and into the interior of the throat part of the gate ring and draft tube. These openings decrease in size from the exterior toward the interior, as is clearly shown in Figure 2.

Extending around the throat part of the gate ring and draft tube, and around the part thereof through which the openings 8 extend, is a ring 9 which has therein a plurality of openings 10, each one being adapted to align with one of the tangential openings 8 so that water passing through the openings 10 may pass through the openings 8 into the draft tube. These openings 8 enter the draft tube below the runner 2. The openings 8 and 10 may be brought out of alignment with each other so that the ring 9 will close the openings 8 and prevent water passing through these openings into the draft tube, or these openings may be arranged so there is only a restricted passageway through each set of openings.

The draft tube is supported on the base 12. For the purpose of rotating the ring 9 there is provided a shaft 13, suitably supported on some suitable part of the turbine structure. An arm 14 is attached at one end to this shaft, to the other end of which arm is attached one end of a link 15. The other end of the link 15 is attached by means of an ear 16 to the ring 9.

Any rotation of the shaft 13 will cause the ring 9 to move either for aligning the openings 10 with the openings 8, or for adjusting the relationship between the openings so as to close the openings 8, or partially close these openings, and thereby form restricted passageways for water into the throat part of the draft tube beneath the runner.

The turbine structure is immersed in a head of water. The water passes about the support 5 and the runner 2, in a path substantially parallel to the runner shaft. This water acting upon the buckets causes the runner and the shaft to rotate. The water in acting upon the buckets is likewise acted upon by the buckets and given a whirling movement.

In order to increase this whirling movement and to add speed to the water as it leaves the buckets, water is admitted into the draft tube beneath the buckets in the same directions that the water in the tube is whirling, and at a greater speed. These small streams of water are moving at a greater velocity than the water that has passed by the runner and the buckets, and since these small streams of water have a greater velocity and are moving substantially in the same direction that the water which has acted upon the buckets is moving, an increase in velocity is caused in this water that has passed by the buckets, thereby causing a more rapid removal of the water and the creation of a partial vacuum, whereby more water is drawn rapidly through the buckets and by the runner for rotating the runner shaft.

The quantity of water admitted through the openings 8 may be regulated by the ring 9. This ring 9 will not only regulate the quantity but will also regulate the velocity of the water passing through the openings. The larger the openings the greater the quantity of water, and the higher the velocity of the water passing through the openings.

It will be understood that I desire to comprehend within this invention such modifications as come within the scope of the claims and the invention.

Having thus fully described my invention, what I claim as new and desire to secure by Letters Patent, is:

1. In a method of operating a turbine, directing water axially of the turbine shaft and introducing water below the turbine to create a whirling component of the water therebelow, and directing said water so introduced in a straight line at an angle to the vertical line of flow of that water below the turbine and tangentially thereof.

2. In a method of operating a turbine, directing water axially of the turbine shaft and introducing water below the turbine to create a whirling component of the water therebelow at a higher speed than the water passing over the turbine, and directing said water so introduced in a straight line at an angle to the vertical line of flow of that water below the turbine and tangentially thereof.

3. In a method of operating a hydraulic turbine, delivering water axially thereover and delivering water beneath the turbine tangentially of said axis to form a whirling component around said axis below the turbine, and directing said water so introduced in a straight line at an angle to the vertical line of flow of that water below the turbine and tangentially thereof.

4. In a method of operating a hydraulic turbine, delivering water axially thereover and delivering water beneath the turbine tangentially of said axis to form a whirling component around said axis below the turbine, and removing the body of water in an expanded body below the point of imparting a whirl thereto, and directing said water so introduced in a straight line at an angle to the vertical line of flow of that water below the turbine and tangentially thereof.

5. In an axial flow hydraulic turbine, a draft tube having tangential ports arranged in an annular series in the side wall thereof, said ports comprising a plurality of tangentially disposed, angularly directed, straight walled ports, a plurality of stationary guide vanes mounted on said draft tube supporting a runner shaft, a runner shaft, a hub, and a plurality of buckets mounted on said hub beneath said vanes and above the ports in the draft tube.

6. In an axial flow turbine, a draft tube having a constricted portion and a plurality of tangentially-disposed, angularly-directed, straight-walled ports adapted to discharge fluid into the draft tube at an angle to the main flow through the draft tube and a runner mounted on said draft tube above said ports.

7. In an axial flow turbine, a draft tube having a constricted portion and a plurality of tangentially-disposed, angularly-directed, straight-walled ports adapted to discharge fluid into the draft tube at an angle to the main flow through the draft tube, and a runner mounted on said draft tube above said ports, and means to adjust the opening and closing of said ports to adjust the amount of whirling component imparted to the axial flow of water through the draft tube prior to the expansion of the water in the downwardly and outwardly flaring portion of the draft tube below the constriction thereof.

8. A new article of manufacture for use as a draft tube comprising a draft tube having a constricted area, the upper portion of the draft tube converging thereto and the lower portion of the draft tube flaring therefrom, said draft tube having a plurality of downwardly directed tangential ports in the constricted area in communication with the head waters above and outside of said draft tube.

GEORGE A. BIGGS.